Dec. 8, 1953  E. A. HENRY  2,662,172
OSCILLATOR CANCELLATION FREQUENCY CONVERTER
Filed Feb. 21, 1950  2 Sheets-Sheet 1

INVENTOR.
ELLIOTT A. HENRY
BY
Joseph H. Lipschutz
ATTORNEY.

Dec. 8, 1953  E. A. HENRY  2,662,172
OSCILLATOR CANCELLATION FREQUENCY CONVERTER
Filed Feb. 21, 1950  2 Sheets-Sheet 2

INVENTOR.
ELLIOTT A. HENRY
BY
Joseph H. Lipschutz
ATTORNEY.

Patented Dec. 8, 1953

2,662,172

UNITED STATES PATENT OFFICE 2,662,172

OSCILLATOR CANCELLATION FREQUENCY CONVERTER

Elliott A. Henry, Bridgeport, Conn., assignor to Sperry Products, Inc., Danbury, Conn., a corporation of New York Application February 21, 1950, Serial No. 145,480

3 Claims. (Cl. 250—20)

In ultrasonic inspection of objects by the Reflectoscope method in which pulses are transmitted into the object and received therefrom, better resolution and brightness can be obtained by using a video type of presentation wherein the energy of a pulse is transformed into an outline. To effect this type of presentation, a superheterodyne type of receiver with a video detector and amplifier is required. Because of the wide pass-bands required in the intermediate frequency amplifier due to the short pulses which are found most desirable for certain types of ultrasonic testing, and because of the necessity for heterodyning the input signal voltage to a much higher frequency, the local heterodyning oscillator frequency often falls within or adjacent to the pass-band of the I. F. amplifier. This heterodyning oscillator voltage is usually sufficient to block one or more stages of the I. F. amplifier and cause inferior performance.

It is therefore a principal object of this invention to provide a method and means for eliminating the local heterodyning oscillator voltage from the input of the I. F. amplifier.

Further objects and advantages of this invention will become apparent in the following detailed description thereof.

In the accompanying drawings.

Figure 1:
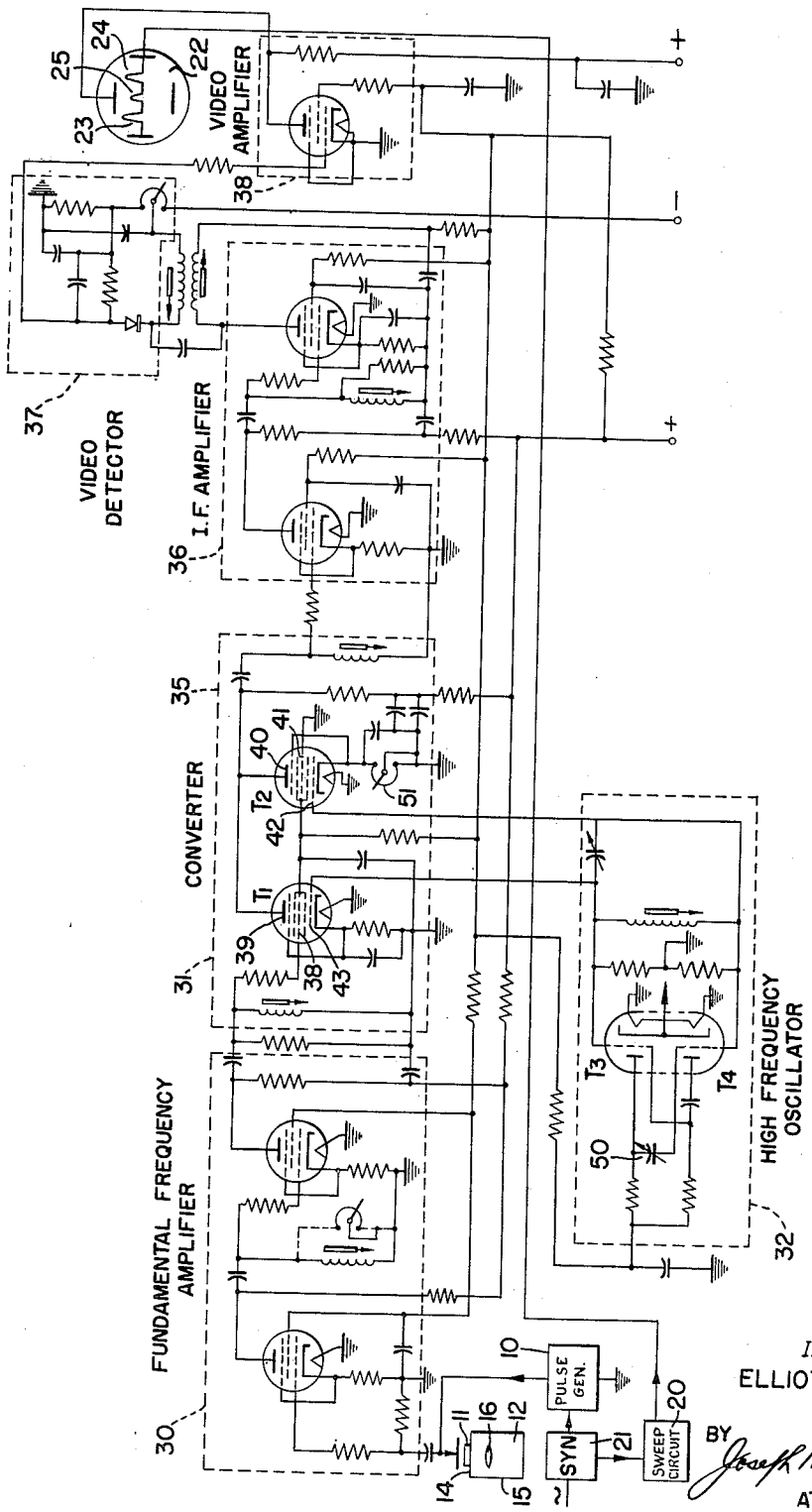
Fig. 1 is a wiring diagram showing my invention applied to the ultrasonic inspection of objects.
Figure 2:
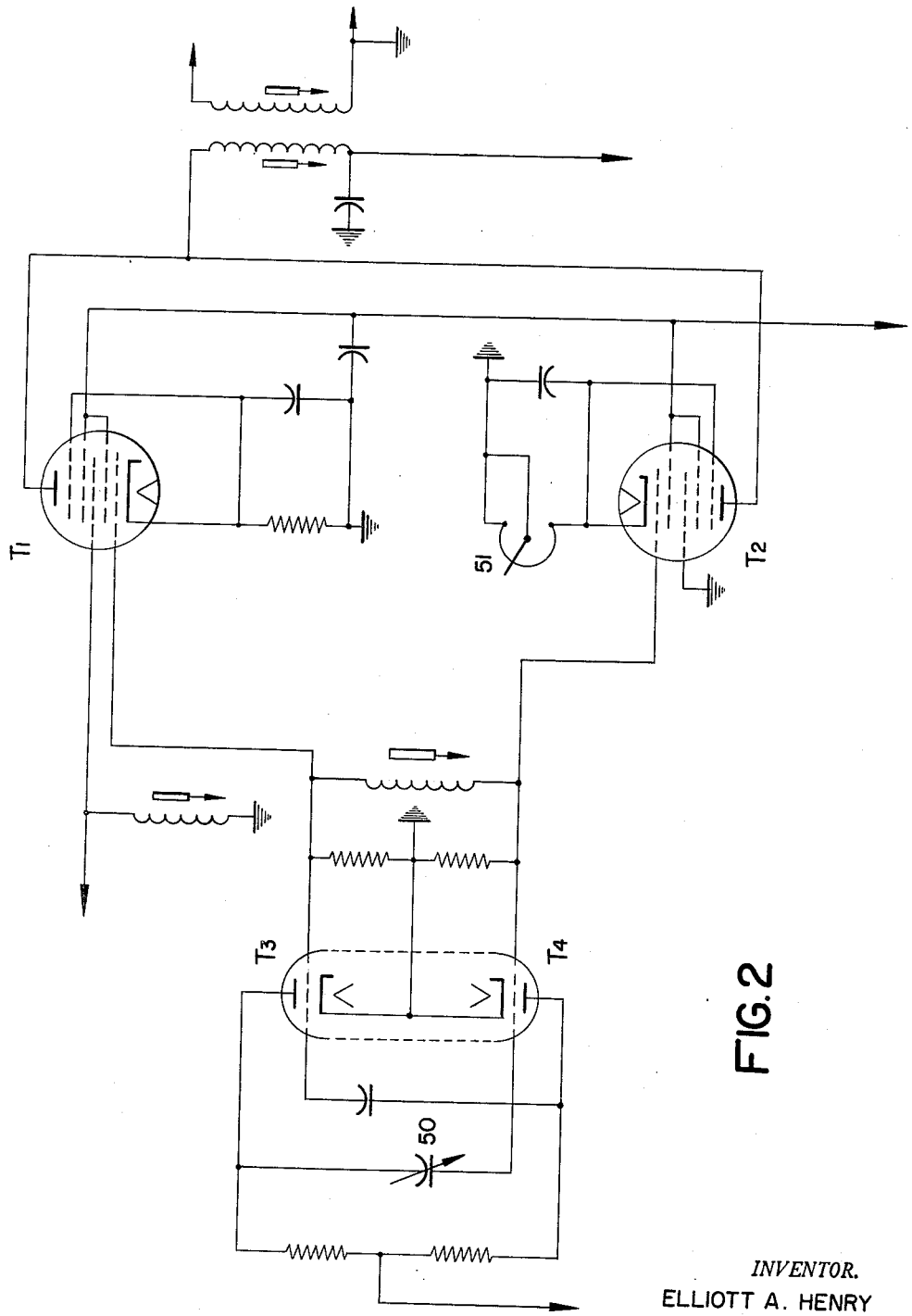
Fig. 2 is an enlarged diagram of the essential elements of the invention.

Referring to Fig. 1 of the drawings it will be seen that I have disclosed my invention as applied to the ultrasonic testing of objects, although it will be apparent from the following description that the invention has general application wherever it is found desirable to eliminate the local oscillator voltage from the input of the intermediate frequency amplifier of a superheterodyne circuit. In the Fig. 1 application, ultrasonic pulses generated periodically by a pulse generator 10 are applied to a piezo-electric element in the form of a quartz crystal 11 in contact with one surface 14 of an object 12 which is to be inspected. The pulse travels into the object until it strikes the opposite surface 15 of the object which will reflect the pulse back to the crystal. Any intermediate surface such as a fissure 16 will also reflect the pulse. The energization of the crystal by the generated pulse and by reflected pulses may be indicated upon an oscilloscope 22 in which the sweep circuit 20 is synchronized with the generated pulse by a synchronizer 21 which may be periodically energized, as, for instance, by a 60 cycle A. C. source. The energization voltage of the crystal, after being suitably amplified, as will be described hereinafter, is applied to the vertical plates of the oscilloscope to cause deflection of the sweep. Thus, the indication 23 shows the generated pulse, the indication 24 shows the pulse which is reflected from the opposite surface 15 of the object, and if there is an intermediate indication 25 it indicates the presence of a flaw, such as fissure 16.

In the normal operation of the device, the energization of crystal 11 by the pulse generator or by reflections of the pulse will be amplified by amplifier 30 at the fundamental frequency, which may be, for example, 1 megacycle. The output of the amplifier 30 may be fed into a converter 31 where it is heterodyned with a relatively high frequency oscillation, for example, 29 megacycles, generated by a local oscillator. The reason for converting the low frequency alternations contained in the original pulse to high frequency alternations results from the fact that the time constant 50 of the video detector load must be long with respect to the period of the individual alternations of the R. F. pulse, and at the same time be short with respect to the period of the entire R. F. pulse in order to provide a video pulse whose envelope corresponds to the R. F. envelope and has a fast return to zero after the R. F. pulse has terminated.

The output of the converter will comprise a plurality of frequencies including the original fundamental frequency (in the example chosen—1 megacycle), the heterodyned frequency (in the example chosen—either 28 or 30 megacycles), and the local oscillator frequency (29 megacycles). The output from the converter is fed into a band pass circuit 35 of low impedance to the fundamental signal so that little fundamental signal voltage is developed, but the heterodyned frequency and the local oscillator frequency will develop voltages which are fed into the intermediate frequency amplifier 36. The output of the I. F. amplifier after passing through a video type detector 37 and being amplified by a video type amplifier 38 is applied to the vertical plates of the oscilloscope.

In the above described system it is desirable for certain types of ultrasonic testing that the generated pulse be of short duration for maximum resolution. Because of the short duration of the pulse, the intermediate frequency amplifier requires a relatively wide band pass since the band width in megacycles is approximately inversely proportional to the pulse length in microseconds $$\text{B.W. in megacycles} = \frac{2}{\text{Pulse length in microseconds}}$$

Because of the relatively wide band pass, it sometimes happens that the local oscillator frequency is within, or closely adjacent to, the band pass and causes blocking of the tubes of the I. F. amplifier. In order to eliminate or greatly attenuate the local oscillator voltage from the output of the frequency converter, or input to the I. F. amplifier, there may be provided a pentagrid tube $T_2$ whose plate is connected with the plate 39 of pentagrid tube $T_1$ in the converter. The output from amplifier 30 is applied to the control grid 38 of tube $T_1$, while the control grid 41 of tube $T_2$ is grounded. The local oscillator 32 is of the push-pull type comprising tubes $T_3$ and $T_4$, the outputs of the oscillator being coupled to the injection grids 42 and 43 of tubes $T_2$ and $T_1$, and if the output voltages from $T_2$ and $T_1$, due to these oscillator frequency components are equal in amplitude and opposite in phase, these voltages will cancel. For securing 180° out-of-phase relation between the components, a capacitor 50 in the oscillator circuit is made adjustable, and for equalizing the amplitudes of the outputs due to the oscillator component a resistor 51 may be provided in the circuit of tube $T_2$ to vary the gain.

It will be seen that both the input and output circuits are single-ended, i. e., unbalanced with respect to ground, as distinct from push-pull or balanced circuits.

Having described my invention, what I claim and desire to secure by Letters Patent is:

1. In a heterodyne frequency converter system having both input and output circuits unbalanced with respect to ground, a device for eliminating the heterodyne oscillator voltage from the output of the converter system, comprising a heterodyne circuit including a converter and a heterodyne oscillator for generating voltages adapted to be heterodyned in the converter with an incoming signal voltage, and means for injecting into the converter output circuit a voltage equal in frequency and amplitude and opposite in phase to the heterodyne oscillator frequency voltage normally present in the converter output circuit.

2. In a heterodyne frequency converter system having input and output circuits unbalanced with respect to ground and comprising a frequency converter and a heterodyne oscillator, a device for eliminating the heterodyne oscillator current from the output of the converter system, said oscillator having two output circuits balanced with respect to ground, means for adjusting the phase of the output voltage of one of the circuits with respect to ground and means for maintaining 180° phase difference between the output voltages of the two circuits, means for applying the output voltage from one of said circuits to the input of the converter system, and means including an amplifier-inverter means for applying the output voltage from the second circuit to the output of the converter system.

3. In a heterodyne frequency converter system comprising a frequency converter and a heterodyne oscillator with both input and output circuits unbalanced with respect to ground, a device for eliminating the heterodyne oscillator current from the output of the converter system, amplifier-inverter means, the output of said oscillator being coupled to the input of the converter system and to the amplifier-inverter means, and means for coupling the output of the amplifier-inverter means to the output of the converter system.

ELLIOTT A. HENRY.

References Cited in the file of this patent
UNITED STATES PATENTS

| Number | Name | Date |
|---|---|---|
| 1,794,645 | Runge | Mar. 3, 1931 |
| 2,122,401 | Armstrong | July 5, 1938 |
| 2,403,984 | Koenig | July 16, 1946 |
| 2,486,076 | Strutt | Oct. 25, 1949 |